United States Patent
Fee et al.

(10) Patent No.: US 8,120,324 B2
(45) Date of Patent: Feb. 21, 2012

(54) METHOD AND APPARATUS TO PROVIDE BATTERY REJUVENATION AT OR NEAR RESONANCE

(75) Inventors: John Arthur Fee, Garland, TX (US); Brian L. Graham, Carrollton, TX (US)

(73) Assignee: Advanced Battery Management, LLC, Irving, TX (US)

( * ) Notice: Subject to any disclaimer, the term of this patent is extended or adjusted under 35 U.S.C. 154(b) by 1040 days.

(21) Appl. No.: 11/983,972

(22) Filed: Nov. 13, 2007

(65) Prior Publication Data

US 2008/0079397 A1 Apr. 3, 2008

Related U.S. Application Data

(63) Continuation-in-part of application No. 11/363,572, filed on Feb. 27, 2006, now abandoned.

(51) Int. Cl.
*H02J 7/00* (2006.01)
*H02J 7/04* (2006.01)
*G01N 27/416* (2006.01)
*G08B 21/00* (2006.01)

(52) U.S. Cl. ........ 320/131; 320/132; 320/149; 324/426; 340/636.1; 340/636.21

(58) Field of Classification Search .................. 320/131
See application file for complete search history.

(56) References Cited

U.S. PATENT DOCUMENTS

| | | | |
|---|---|---|---|
| RE35,643 E * | 10/1997 | Gali | 320/119 |
| 6,566,844 B1 * | 5/2003 | Schlicht | 320/131 |
| 2005/0127875 A1 * | 6/2005 | Hall | 320/131 |
| 2005/0156570 A1 * | 7/2005 | Inui et al. | 320/132 |
| 2005/0248314 A1 * | 11/2005 | James | 320/131 |

\* cited by examiner

*Primary Examiner* — Yalkew Fantu
(74) *Attorney, Agent, or Firm* — Robert C. Klinger

(57) ABSTRACT

A system and method adapted to rejuvenate batteries at or near the resonant frequency of the battery. The present invention takes a battery and applies a modulated current charging signal to increase battery performance. A resonant signal is adapted to re-train and adjust battery materials for proper operation. By repeated charge/discharge cycling, battery memory decreases and/or battery capacity increases, thereby improving the battery capacity.

9 Claims, 3 Drawing Sheets

METHOD AND APPARATUS TO PROVIDE BATTERY REJUVENATION AT OR NEAR RESONANCE

PRIORITY CLAIM

This application is a Continuation-In-Part of U.S. patent application Ser. No. 11/363,572, entitled "METHOD AND APPARATUS TO PROVIDE CHARGING WAVEFORM TO LITHIUM ION BATTERIES" filed Feb. 27, 2006 now abandoned, the teachings of which are incorporated herein by reference.

FIELD OF THE INVENTION

The present invention is generally related to batteries, and more specifically to battery rejuvenation at or near the resonant frequency.

SUMMARY OF INVENTION

The present invention achieves technical advantages as a system and method adapted to rejuvenate batteries at or near the resonant frequency of the battery. The present invention takes a battery and applies a modulated current charging signal to increase battery performance. One embodiment of the invention utilizes a resonant signal to re-train and adjust battery materials for proper operation. By repeated charge/discharge cycling, battery performance increases, thereby improving the battery capacity.

The user is typically faced with batteries which have lost capacity by miss-used typically by either improper charging techniques, improper discharge techniques, infrequent use of the battery, or general wear and tear. It has been shown that batteries respond to better treatment and may actually increase capacity it lost. Proper charging and rejuvenation techniques in many cases "bring back" batteries which are characterized as "dead."

DETAILED DESCRIPTION OF THE PRESENT INVENTION

Figure 1:
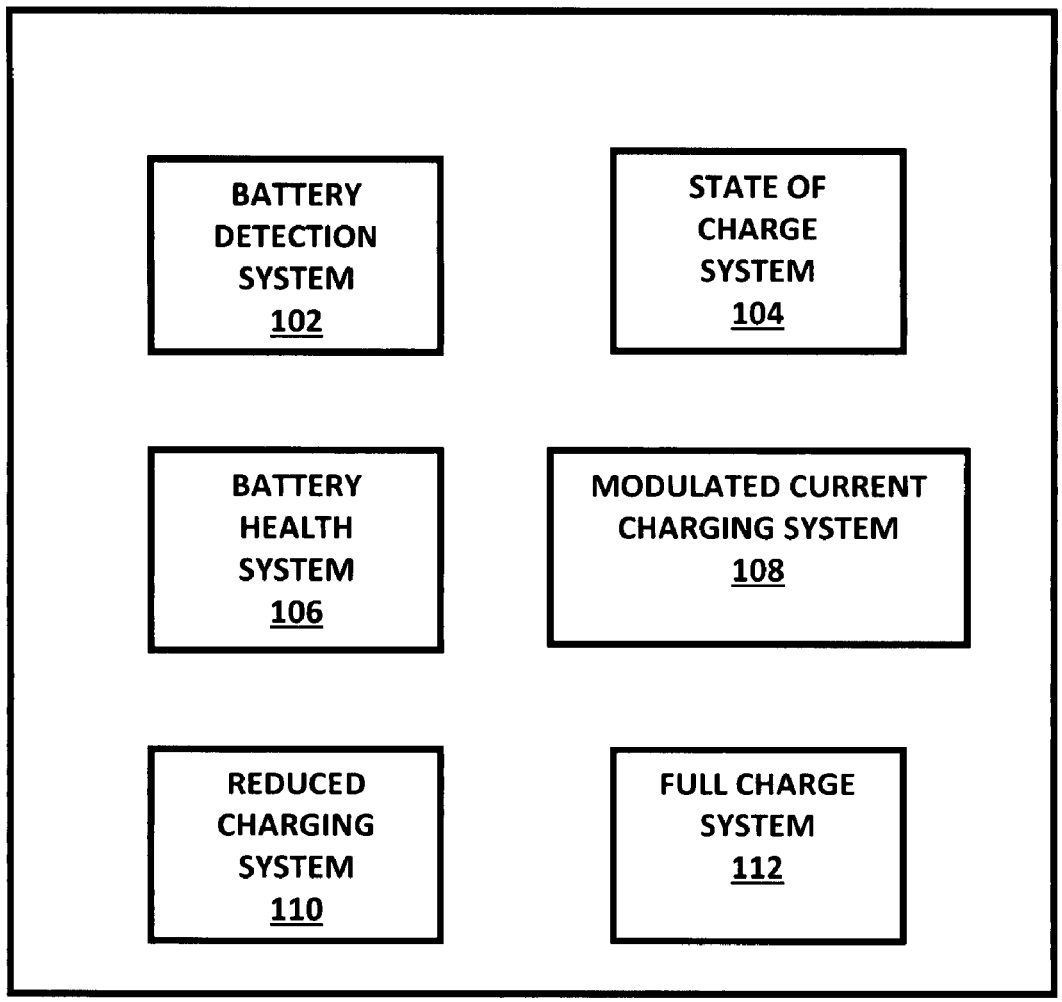
FIG. 1 is a diagram of a Battery Charger Block Diagram using a Rejuvenation and full charge System in accordance with an exemplary embodiment of the present invention.

Referring to FIG. 1, there is shown at 100 a diagram of a system for providing battery rejuvenation in accordance with an exemplary embodiment of the present invention. A resonance signal is adapted to retrain or adjust the battery. To rejuvenate the battery, defective material, such as cathode metal migration or other such degradation effects, are re-arranged and reduced to minimize effect on the system. System 100 can be implemented in hardware, software or a suitable combination of hardware and software and can be one or more software systems operating on a digital signal processing platform or other suitable processing platforms. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

System 100 includes battery detection system 102, state of charge system 104, battery State Of Health system 106, modulated current charging signal generation system 108, reduced charging system 110, and full charge system 112.

Battery detection system 102 is adapted to sample an open-circuit voltage (Voc) and other such detection methods which determine whether a battery is present in a charger. The Voc is periodically measured at the charging terminals of the charger. In one exemplary embodiment Voc is sampled every second. In one exemplary embodiment, a microcontroller disposed within the charger is adapted to periodically sample Voc.

State of charge (SOC) system 104 determines the resident energy level (charge) in the battery. The SOC of the battery will determine charging parameters associated with the rejuvenation, as well as the charge duration. In one exemplary embodiment, the microcontroller disposed within the charger is adapted to determine SOC.

Battery health system 106 determines the health of a battery with respect to capacity and voltage. In one exemplary embodiment, a battery may be considered unhealthy if it can only be charged to 50% of its capacity. State Of Health can be set at any arbitrary level. In addition, if Voc is between 0.5V and 9V, battery health is poor and requires rejuvenation. Voc can be set at any arbitrary level to determine poor health. If the battery health is between 9V and 22V, the battery health is capable of accepting full charge current and does not require rejuvenation Voc can be set at any arbitrary level to determine good health. In a second exemplary embodiment, the microcontroller disposed within the charger is adapted to determine battery health. In a third exemplary embodiment, battery health system 106 determines a useful capacity of the battery.

Modulated current charging signal generation system 108 modulates a current charging signal at or near the resonant frequency of the battery, or harmonics or derivatives thereof, when the battery requires rejuvenation. The modulated current charging signal is initiated at a current less than full strength, and slowly increased to full strength. In one exemplary embodiment, upon insertion of a healthy battery, the microcontroller disposed within the charger is adapted to modulate a current charging signal, and ramp up the current supplied to a battery to the maximum pre-determined Charge Rate (C Rate).

Reduced charging system 110 modulates a second current charging signal at or near the resonant frequency of the battery, or harmonics or derivatives thereof, when the battery also requires rejuvenation. The modulated current charging signal is initiated at a predetermined small signal current and slowly applied to the battery. In one exemplary embodiment, the microcontroller disposed within the charger is adapted to modulate a current charging signal, and "wake up" the current supplied to a battery. In a second exemplary embodiment, if the battery has a charge acceptance capacity lower than an original battery capacity, the second current charging signal is initiated with a magnitude less than full rate.

Full charge system 112 modulates a current charging signal at or near the resonant frequency of the battery, or harmonics or derivatives thereof, when the battery does not require rejuvenation. The modulated current charging signal is initiated at full rate and applied to the battery. In one exemplary embodiment, the microcontroller disposed within the charger is adapted to modulate a current charging signal, and provide a full-current modulated charging signal to a battery.

Figure 2:
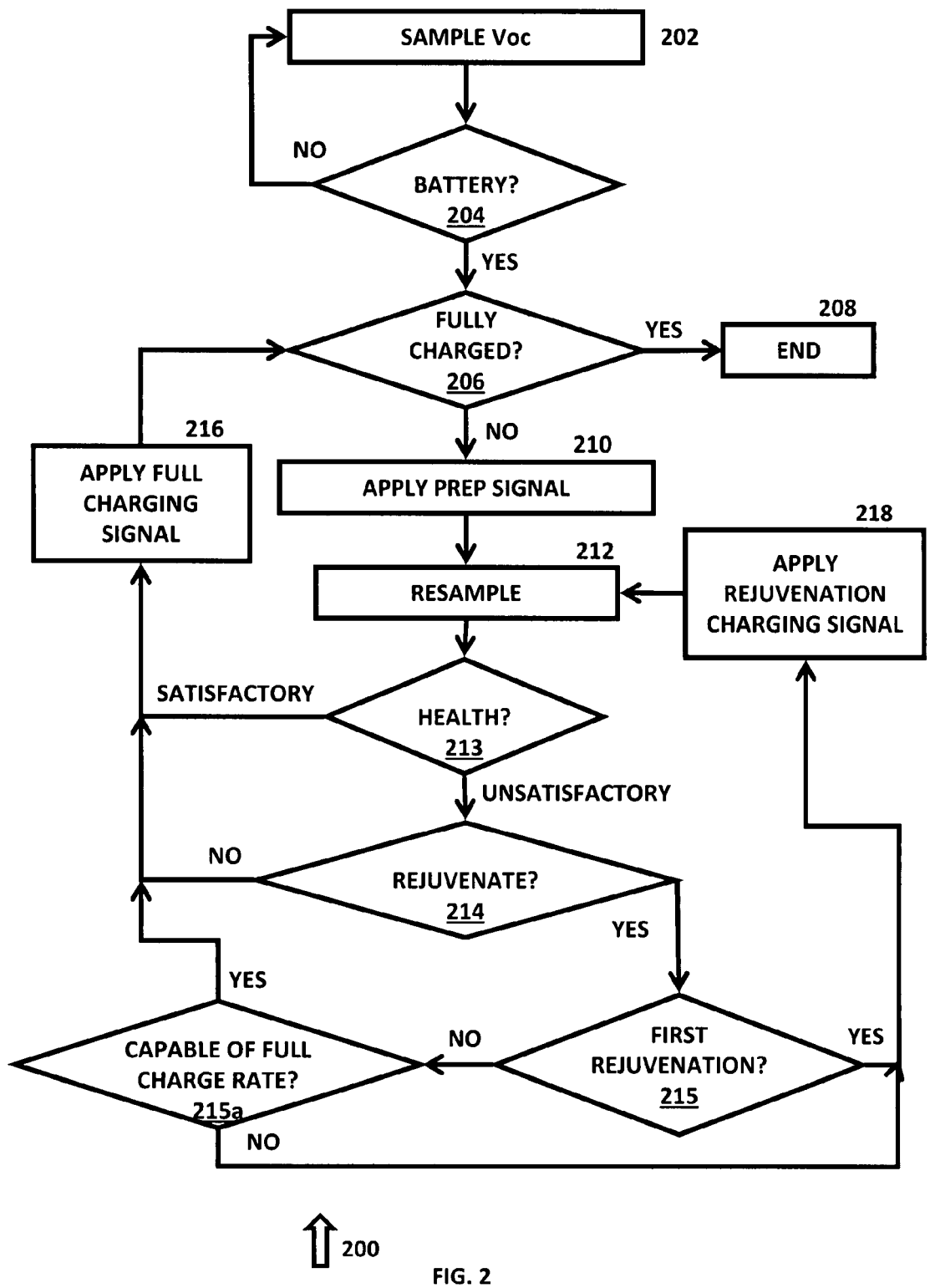
FIG. 2 is a diagram of a Charger utilizing an entire Charge or Rejuvenation Logic Diagram in accordance with an exemplary embodiment of the present invention.

Referring now to FIG. 2, there is shown at 200 a diagram of a method for rejuvenating a battery, in accordance with an exemplary embodiment of the present invention. An open circuit voltage (Voc) of the charger at the charging terminals is approximately 25V. In one exemplary embodiment, Voc is measured every 1 second. Method 200 can be implemented as an algorithm on a general purpose computing platform or other suitable systems.

The method begins at 202, where Voc is sampled. The method then proceeds to 204.

At 204, it is determined whether a battery is in the charger. In one exemplary embodiment, if after Voc is sampled, Voc drops below 22V, the charger determines that a battery has been inserted into the charger. If it is determined that there is a battery in the charger, the method proceeds to 206. If there is not a battery in the charger, the method proceeds to 202 to be sampled at the appropriate time.

At 206, it is determined whether the battery is fully charged (State Of Charge). In one exemplary embodiment, battery charge acceptance is measured and determined. If the battery is fully charged, the method proceeds to 208. If the battery is not fully charged, the method proceeds to 210.

At 208, the charging or rejuvenation method is terminated.

At 210, the charger applies a modulated preparation current charging signal to the battery for approximately 900 milliseconds. This initial application of current prepares the battery to accept a full charge. In one exemplary embodiment, the modulated preparation current charging signal is modulated at or near the resonant frequency of the battery, or harmonics or derivatives thereof. The method then proceeds to 212.

At 212, the battery is open-circuited and Voc is again sampled at the 1 second interval. The method then proceeds to 213.

At 213 battery State Of Health is determined. In one exemplary embodiment Voc is sampled to determine SOH and the method then proceeds to 214.

At 214, it is determined whether the battery requires rejuvenation. In one exemplary embodiment, if Voc falls below 0.5V, the method is terminated for safety purposes. If Voc is between 9V and 22V, the battery does not require rejuvenation and the method proceeds to 216. If Voc is between 0.5V and 9V, the battery requires rejuvenation and the method proceeds to 215.

At 215, it is determined whether the instant charging cycle is the first rejuvenation cycle. If the instant charging cycle is the first rejuvenation cycle, the method proceeds to 218. If the instant charging cycle is not the first rejuvenation cycle, the method proceeds to 215a.

At 215a it is determined whether the battery is capable of a full charge signal. If the battery is capable of a full charge signal, the method proceeds to 218. If the battery is not capable of a full charge signal, the method proceeds to 216.

At 216, a full current charging signal is modulated at or near the resonant frequency of the battery, or harmonics or derivatives thereof, and applied to the battery for approximately 800-900 milliseconds. The modulated, current charging signal is slowly ramped up to full charging strength. The method then proceeds to 206.

At 218, a current charging signal is modulated at or near the resonant frequency of the battery, or harmonics or derivatives thereof, and slowly applied to the battery. In one exemplary embodiment, a nickel-metal hydride (NiMH) battery needing rejuvenation is supplied the modulated current charging signal trickled at or near the 1 C rate depending on battery capacity. In a second exemplary embodiment, a nickel-cadmium (NiCd) battery needing rejuvenation is supplied the modulated current charging signal trickled at or near the 1 C rate depending on battery capacity. The method then proceeds to 202.

As long as Voc is between 0.5V and 9V, the modulated current charging signal is applied at the appropriate C rate. Once Voc is over 9 volts, the battery is charged at full rate with the modulated current charging signal. In one exemplary embodiment, safety shutdown logic terminates all charging if necessary.

Figure 3:
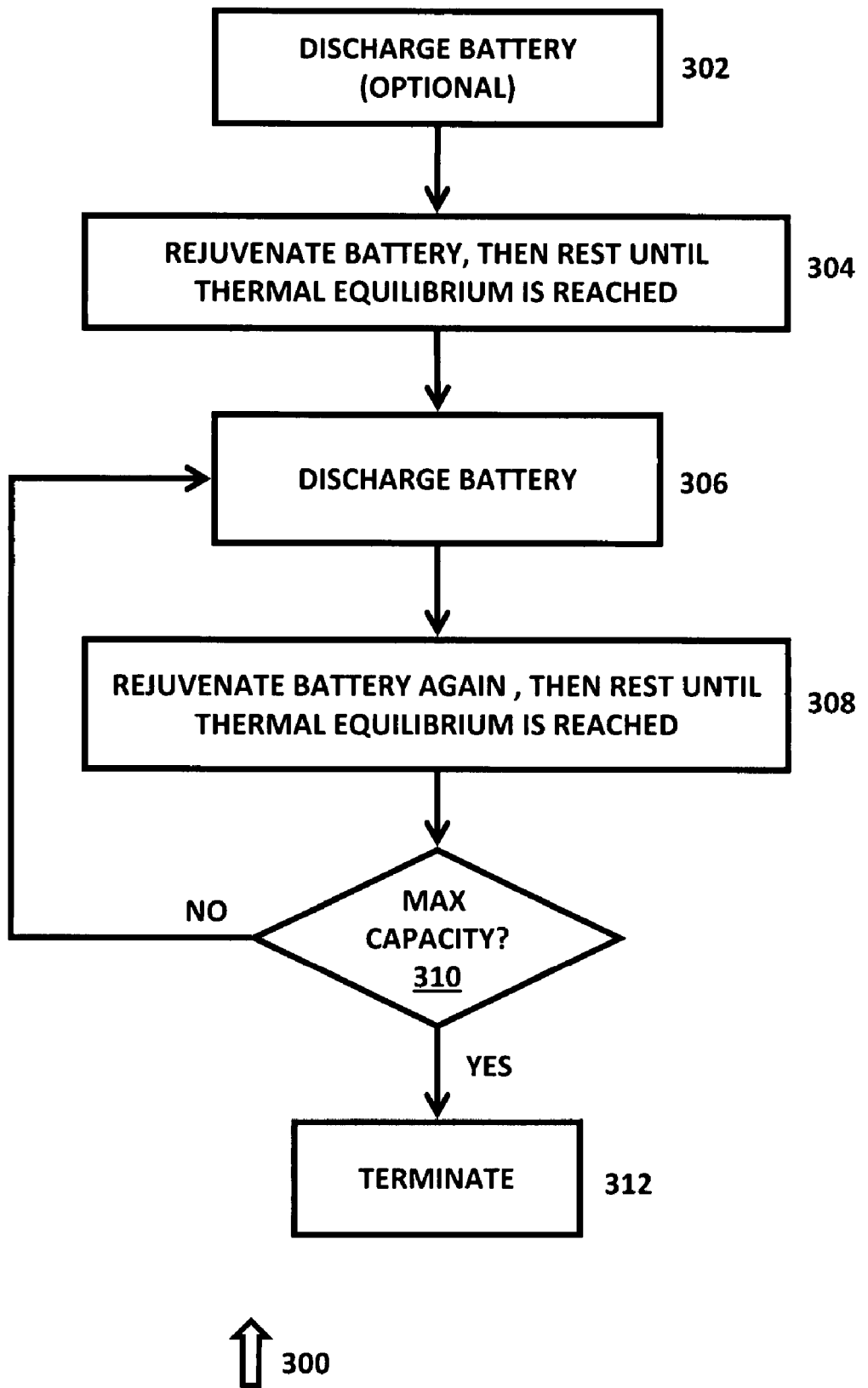
FIG. 3 is a diagram of a Battery cycling resulting in improved performance using a Rejuvenation Logic Diagram in accordance with an exemplary embodiment of the present invention.

Referring now to FIG. 3, there is shown at 300 a method for implementing rejuvenation via recycling of a battery in accordance with an exemplary embodiment of the present invention. Recycling refers to rejuvenating the battery, allowing it to reach thermal equilibrium, discharging it, and allowing it to reach thermal equilibrium. The more times the battery is cycled via rejuvenation, the closer the battery's SOH approaches its ideal capacity. Method 300 can be implemented as an algorithm on a general purpose computing platform or other suitable systems.

The method begins at 302, where a battery requiring rejuvenation is discharged. In one exemplary embodiment, the battery does not need to be discharged because the battery has effectively no charge. The method then proceeds to 304.

At 304, the battery is charged and allowed to rest until thermal equilibrium is reached. In one exemplary embodiment, the battery is charged and then cooled allowed to cool to room temperature for approximately 1 hour, according to the method disclosed in FIG. 2. The method then proceeds to 306.

At 306, the battery is discharged until most if not all of the battery capacity is depleted. The method then proceeds to 308.

At 308, the battery is again rejuvenated (charged and allowed to rest) until it reaches thermal equilibrium, according to the method disclosed in FIG. 2. Note that during subsequent cycling, the battery may allow near or full charge current acceptance or discharge current delivery during or after the first cycle because partial rejuvenation has begun. The method then proceeds to 310.

At 310, it is determined whether the battery has achieved its maximum capacity. If the battery has achieved maximum capacity, the method proceeds to 312. If the battery has not achieved maximum capacity, the method proceeds to 306.

At 312, the method is terminated.

The present invention derives technical advantages because first, other solutions cannot increase or maintain battery capacity over the cycle life of a battery.

The present invention achieves further technical advantages because the end cost of a user is greatly minimized by reducing the number of replacement batteries needed to power an electronic device. Also, the battery rejuvenation is automatically implemented every time a battery is inserted into the charger, eliminating any inconvenience to the user.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A system for providing battery rejuvenation, comprising:
    a battery detection system adapted to determine whether a battery is present;
    a state of charge system adapted to determine a resident charge within the battery;
    a battery health system adapted to determine a useful capacity of the battery;
    a modulated current charging signal generation system adapted to generate a modulated first current charging signal at or near a resonant frequency of the battery and provide the modulated current charging signal to the battery;
    a reduced charging system adapted to generate a modulated second current charging signal at or near the resonant frequency of the battery, if the battery has a charge acceptance capacity lower than the battery's rated capacity, the second current charging signal having a magnitude less than the first current charging signal; and
    a full charge system adapted to provide the modulated first current charging signal to the battery at full rate.

2. The system of claim 1, wherein the battery is a secondary battery.

3. The system of claim 1, wherein the battery is a primary battery.

4. The system of claim 3, wherein the primary battery is a NiCd, NiMH, lead acid, lithium, or other suitable battery chemistry.

5. The system of claim 2, wherein the secondary battery is a NiCd, NiMH, lead acid, lithium, or other suitable battery chemistry.

6. The system of claim 1, wherein the first current charging signal is a harmonic of the resonant frequency of the battery.

7. The system of claim 1, wherein the first current charging signal is a derivative of the resonant frequency of the battery.

8. The system of claim 1, wherein the second current charging signal is a harmonic of the resonant frequency of the battery.

9. The system of claim 1, wherein the second current charging signal is a derivative of the resonant frequency of the battery.

* * * * *